Dec. 19, 1939.   S. W. SEELEY   2,183,725
REMOTE CONTROL SYSTEM
Filed Oct. 23, 1937
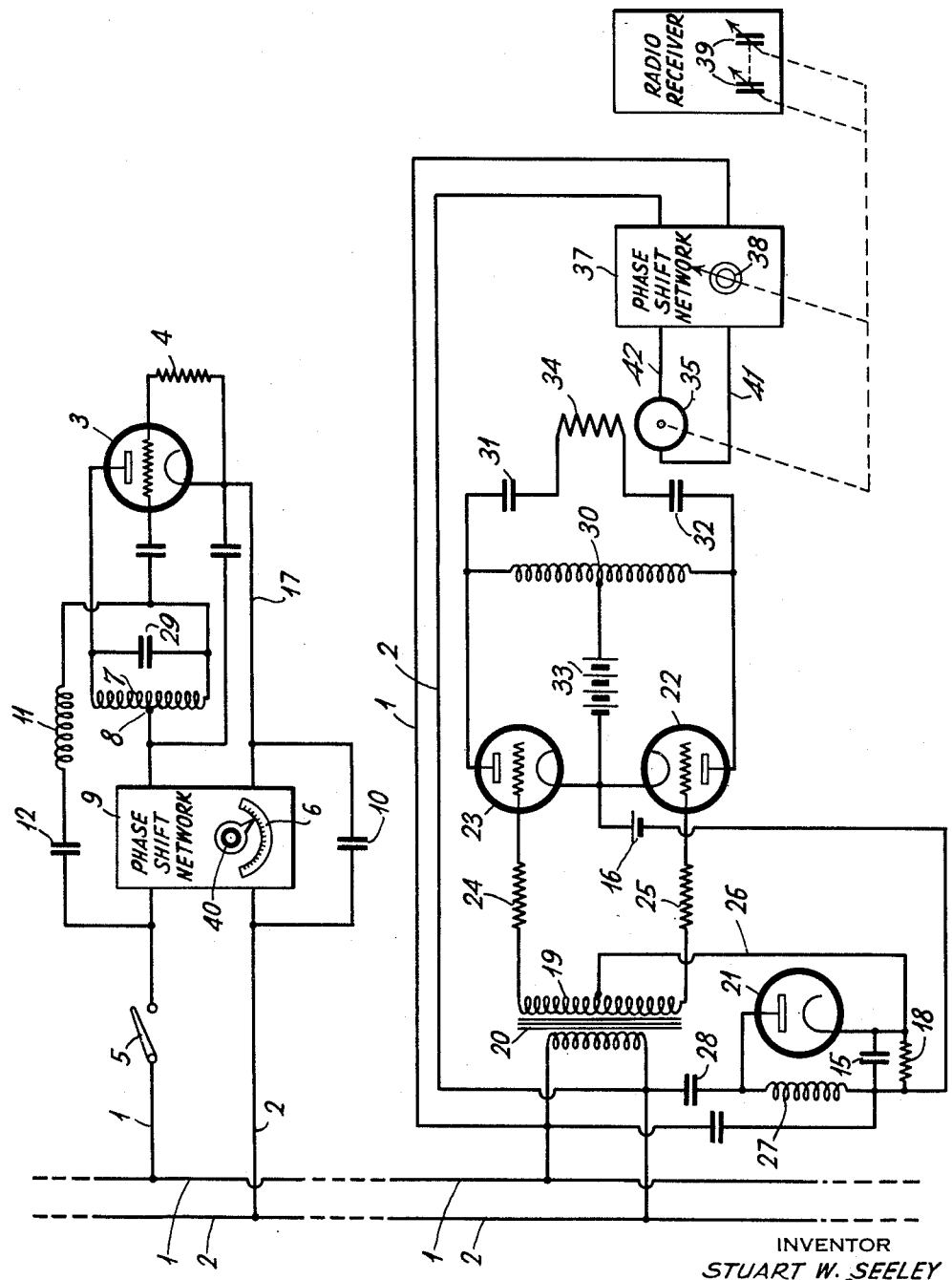
INVENTOR
STUART W. SEELEY
BY
ATTORNEY Patented Dec. 19, 1939

2,183,725

UNITED STATES PATENT OFFICE 2,183,725

REMOTE CONTROL SYSTEM

Stuart W. Seeley, Bayside, Long Island, N. Y., assignor to Radio Corporation of America, a corporation of Delaware Application October 23, 1937, Serial No. 170,575

11 Claims. (Cl. 172—239)

The present invention relates to remote control devices in general and more particularly to an arrangement for controlling the rotation of a shaft from a remote point.

In the particular embodiment of the invention described herein for purposes of illustrating the invention, the shaft to be controlled which may be the tuning shaft of radio receiving apparatus is connected directly or through suitable gears to an electric motor the rotation of which is controlled from a remote point by means of oscillations generated at the remote point and modulated by the available power supply network A. C. voltage in accordance with the controlling action desired. The controlling energy is transmitted to the motor through the power supply network to which the motor is connected through a phase detector device.

The single figure of the drawing illustrates an embodiment of the invention adapted to be used to control from a remote point the tuning instrumentality of a radio receiver.

In the drawing, the power supply network which in most buildings usually supplies 60 cycle 110 volts A. C. is represented generally at 1 and 2 it being understood that the dotted portion signifies that the control unit may be connected to one part of the network, the controlled unit (in this case the radio receiver) connected to the network at some other point as in another room of the house.

The control unit includes an oscillator tube 3 having its plate circuit regeneratively coupled to its grid circuit to produce oscillations of a predetermined frequency as determined by the tank circuit comprising inductance coil 7 and condenser 29. The plate of tube 3 is supplied with 60 cycle A. C. voltage obtained from the power supply line 1, 2 through a suitable phase shift network 9. The network 9 is provided with an operable device 40 which may be operated to shift the phase of the 60 cycle A. C. voltage applied to the plate of tube 3 within a predetermined range of values. Due to the fact that the oscillator tube generates oscillations only when the plate of the tube is positive with respect to its cathode it will be seen that upon closure of switch 5 there will be produced at the remote point oscillation of the predetermined frequency modulated by the A. C. line voltage the phase of the modulation envelope being determined by operation of the phase controller device 40. The controller 40 is provided with a pointer which in conjunction with a suitable marked scale 6 indicates the various degrees of phase shifts. It follows at once that scale 6 could be marked so that the various indications correspond to the various stations to which it is desired to tune the receiver. The modulated oscillator output is impressed upon the supply network 1, 2 through the coupling circuit comprising coil 11 and condenser 12. A by-pass condenser 10 is provided in the event it is desirable to by-pass the controlling oscillations around the phase shifter device 9. Thus the controlling modulated oscillations are transmitted along the power supply network to the controlled point which in the example here being considered is the point where the receiver is located. It is evident now that there will be available at the controlled point, or for that matter anywhere along the house network, oscillations of the predetermined frequency modulated by the power supply A. C. voltage, the phase angle between the modulation envelope thereof and the line voltage determining the controlling action desired. To determine the action desired it is, of course, necessary to compare the phase of the A. C. line voltage and the phase of the modulation envelope and from this comparison to obtain the phase angle between them. For this purpose there is provided a phase detector comprising a pair of electronic tubes 22 and 23 connected push-pull fashion. The tubes are biased by means of a suitable biasing means shown generally as a battery 16. The reason for biasing the tubes is to maintain them in a nonoperative condition in the absence of a controlling voltage on the line. Plate voltage for the tubes may be supplied in any of the well known ways as, for instance, by a battery 33 the positive terminal of which is connected to the plates of the two tubes through a center tap choke coil 30. The load circuit for the push-pull circuit comprises the field winding 34 of an electric motor having an armature 35. The field coil 34 is connected between the plates of the two tubes 22 and 23 through condensers 31 and 32 which act to prevent flow of D. C. through the field coil. It should be noted that the reactance of the choke coil 30 at 60 cycles should be large compared to the reactance of the load circuit for efficient operation of the system.

The motor is constructed so that it will not operate when the flux in the field winding 34 is in quadrature phase relationship to the current through the armature 35 so that a shift in the phase of one with respect to the other is necessary to provide sufficient torque to operate the motor. A motor of the type shown may be constructed by breaking the connection usually provided between the field winding and the armature of an A. C. commutator type series motor and providing separate connections to the armature and the field The push-pull input circuit is coupled to the power supply network through the transformer 20, so that 60 cycle line voltage from line 1, 2 is applied to the grids of the two tubes. It should be noted that the two ends of the tapped secondary winding 19 of transformer 20 are connected to the grids of the tubes 22 and 23 through the resistances 25 and 24 respectively. These resistors are of the order of half a megohm and they cause self-rectification in the grid circuits thus tending to limit the amount of grid current which would flow when the grids are positive with respect to cathodes. The modulated controlling oscillations which are also present in the network are impressed across the line shunt circuit 27 and 28 which is tuned to the frequency of the oscillations by proper choice of the inductance coil 27 and condenser 28. A diode rectifier 21 is connected across the coil 27 through a load resistor 18 shunted by a suitable by-pass condenser 15. The controlling voltage increased by resonant rise in the circuit 27, 28 appears across coil 27 and is thus applied across the diode 21. The diode rectifies the controlling voltage so that there appears across the resistor 18, due to by-pass condenser 15 only the envelope of the modulated controlling oscillations. Resistor 18 is connected in the common portion of the input circuit in series with the biasing means 16 so that any voltage across the resistor 18 is impressed upon the grids of the tubes 22 and 23 in the same sense. As a consequence the rectified voltage control is applied to the grids of tubes 22 and 23 in parallel.

The arrangement of the circuits of tubes 22 and 23 in the circuit is such that it acts as a phase detector to cause the plate-to-plate voltage to be changed in phase due to phase changes between the modulation envelope which appears across resistor 18 and the 60 cycle A. C. voltage which exists across transformer secondary 19. The armature 35 is connected to the A. C. power line 1, 2 through an appropriate phase shift network 37 by means of wires 42 and 41. The armature is coupled mechanically to the shaft of the tuning condensers 39 of the receiver and also to rotatable device 38 which controls the phase shift in network 37.

The phase shift network 37 is interposed between the armature 35 and the line 1, 2 in order that there may be some retarding effect to bring the motor to rest once a change in phase of the control energy modulation envelope causes it to start. The action is such that operation of the motor because of a change in the phase of the modulation envelope operates the phase shift device 38 of the network 37 due to rotation of the armature 35. Since, as previously described, the condition of equilibrium in the motor 34, 35 is that the flux in the field 34 be in quadrature phase relationship to the current through armature 35 once the motor is started, the network 37 is so arranged that rotation causes this relationship to be reestablished when the point which gives the desired setting of the tuning condensers is reached. The rate of change of phase shift in the network 9 is so calibrated in conjunction with the phase shift variation in network 37, that a frequency or station scale can be placed in the remote unit to indicate the position of indicator attached to device 40 for a desired station.

To tune to a station, the knob 40 in the remote unit is turned to a position which corresponds to a previously determined phase shift representing, for instance, one of a plurality of stations. This causes a predetermined shift in phase between the 60-cycle line voltage and the modulating envelope of the output voltage of oscillator 3. The R. F. voltage is picked up in tuned circuit 26, 27 in the receiver unit after having been transmitted over the lines 1, 2. The envelope extracted by rectification in the diode 21 is applied to the grids of tubes 22 and 23 in parallel. The phase relation between this envelope and the A. C. voltage on transformer secondary 19 determines the phase of the voltage between the plates of tubes 22 and 23 and, consequently, that of the flux in the field winding 34.

If the motor has previously been at rest, the departure from the equilibrium condition, namely, that the flux in 34 and the current in 35 be in quadrature phase relationship, causes the motor armature 35 to rotate. Phase shift network 37 is so disposed that the rotation of armature 35 causes a shift in the armature current phase with respect to its previous value. The rate of change of phase shift in 37 is arranged so that the motor turns the condenser bank 39 through appropriate gear trains to the desired point. This point is the one at which the armature current is now in quadrature phase relationship with the new field flux with the result that the motor stops. No further rotation of the motor will result until the phase of the oscillator envelope is again changed, as, for instance, to tune to another station.

While the invention has been described in connection with the operation of the tuning instrumentality of a radio receiver it is to be understood that the invention is equally applicable to any other device which may be operated by means of a motor.

I claim:

1. The method of controlling the angular rotation of a single phase A. C. commutator type motor of the type provided with a field winding and an armature, said motor being arranged so that no operating torque is present when quadrature phase relationship exists between the field flux and the armature current, which method consists in altering the phase of the field flux with respect to the phase of the armature current an amount so as to cause a departure from the quadrature phase relationship corresponding to the angular rotation of the motor desired whereby the motor develops torque causing the motor to rotate and altering the phase of the armature current as the motor rotates at a rate such that the quadrature phase relationship is reestablished when the angular rotation of the motor reaches the desired point.

2. The method described in claim 1 characterized by that the current for producing the field flux is controlled over the A. C. power supply line from a point remote from the motor.

3. In an arrangement for remotely controlling the operation of an electric motor over an alternating current power supply network, means at the remote point for generating oscillations of a predetermined frequency different from the frequency of the network alternating current, means for modulating the generated oscillations by the network alternating current, means comprising a variable phase shifting network for varying the phase of the modulating current in accordance with the motor controlling action desired, a motor to be controlled located at the controlled point, said motor being provided with an armature and a field winding and being arranged so as to be in a state of rest when the field flux is in a predetermined phase relationship to the armature current, means including a phase detector for connecting the field winding to the network, means comprising a variable phase shifting network for connecting the armature to the network and means for operating the last named phase shifting network in accordance with rotation of the motor armature.

4. The method of remotely controlling the operation of an electric motor over an alternating current power supply network, the motor being provided with a field winding and an armature arranged so that the motor is in equilibrium when the field flux is in quadrature phase relationship to the current through the armature, which method consists in generating at the remote point oscillations of predetermined frequency, modulating the generated oscillations by the power supply network alternating current, varying the phase of the modulating current in accordance with the controlling action desired, transmitting the modulated oscillations along the power supply network, intercepting the transmitted energy at the controlled point, detecting the received energy, comparing the phase of the resulting modulation envelope with the phase of the power supply alternating current and producing from the comparison current having a phase which is determined by the phase of the modulation envelope, passing the last produced current through the field winding of the motor, applying to the armature of the motor the alternating current from the power supply network and changing the phase of the last applied current in accordance with the phase of the current applied to the field winding to thereby reestablish the quadrature phase relationship.

5. In an arrangement for remotely controlling the operation of an adjustable element of a radio receiving system over an alternating current power supply network by means of control oscillations which are phase modulated by the network alternating current in accordance with the controlling action desired and impressed upon the network, an alternating current motor for operating said adjustable element, said motor being of the type provided with an armature and a field winding and arranged so that the motor is in equilibrium and therefore at rest when quadrature phase relationship exists between the field flux and the armature current, means including an adjustable phase shifting network for connecting the armature to the power suply network, a connection between the motor and the adjustable phase shifting network for altering the phase of the current fed from the power supply network to the armature with rotation of the armature, a phase detector for connecting the field winding to the power supply network, said phase detector comprising a pair of electronic tubes connected in push-pull, said field winding being connected across the push-pull output circuit.

6. An arrangement as described in the next preceding claim wherein a detector in series with a load resistor is connected across the power supply circuit and wherein said load resistor is connected in the common portion of the push-pull input circuit.

7. The method of remotely controlling the operation of an electric motor over an alternating current power supply network wherein the motor is provided with a field winding and an armature arranged so that the motor is in equilibrium and therefore at rest when the field flux is in quadrature phase relationship to the current flowing through the armature, which method consists in normally applying to the field winding and also to the armature, current derived from the power supply network of such phase relationship as to maintain the motor at rest and causing a predetermined angular rotation of the motor by changing the phase of one of the applied currents to a degree determined by the amount of rotation of the motor desired and causing the rotation of the motor to alter the phase of the other applied current an amount such that the equilibrium phase relationship is reestablished at the point where the motor has rotated the desired amount.

8. In a remote control system operable over an alternating current power supply network by means of control oscillations which are phase modulated by the network alternating current in accordance with the controlling action desired and impressed upon the network, a motor having an armature and a field winding, said motor being arranged to be in a condition of equilibrium and, therefore, inoperative when the field flux is in a predetermined phase relationship to the armature current, means including a phase detector network connecting the field winding to the power supply network, a phase shift network including means for varying the amount of phase shift provided thereby, said armature being connected to said power supply network through said phase shift network and means for coupling the motor armature to said last named means whereby rotation of the motor armature operates said phase shifting means.

9. In an arrangement for remotely controlling the operation of an electric motor over an alternating current electric power supply line from a point which is remote from the motor, means at the remote point for generating carrier oscillations of a predetermined frequency, means for modulating the carrier oscillations by alternating current derived from the power supply line, means for shifting the phase of the modulating current in accordance with the motor controlling action desired, means for transmitting the modulated carrier oscillations over the power supply line to the motor, means at the motor for intercepting the transmitted modulated carrier oscillations and deriving therefrom the modulation current, means for comparing the phase of the modulation current and the phase of the power supply line current and producing from said comparison motor operating current and means for applying the motor operating current to the motor.

10. An arrangement as described in claim 9 wherein the motor is provided with a field winding and an armature and is arranged so that the motor is at rest when quadrature phase relationship exists between the field flux and the armature current, said motor operating current being applied to said field winding to produce the field flux, a variable phase shifting network for connecting the power supply line to the motor armature to supply the motor armature with alternating current from the power supply line, and means for varying said phase shifting network in accordance with the operation of the motor.

11. In an arrangement for remotely controlling the operation of an electric motor over an alternating current power supply network, means at the control point for generating carrier oscillations of a predetermined frequency, means for modulating the carrier oscillations by alternating current derived from the power supply line, means for shifting the phase of the modulating current in accordance with the motor controlling action desired, means for transmitting the modulated carrier oscillations over the power supply line to the motor, means at the motor for intercepting the transmitted modulated carrier oscillations and deriving therefrom the modulation current, means for comparing the phase of the modulation current and the phase of the power supply line current and producing from said comparison motor operating current, means for applying the produced motor operating current to the motor, said motor being provided with a field winding and an armature and arranged so that the motor is at rest when quadrature phase relationship exists between the field flux and the armature current, said motor operating current being applied to said field winding to produce the field flux, a variable phase shifting network for connecting the motor armature to the power supply line and thereby supply the motor armature with alternating current from the power supply line, means for varying said phase shifting network in accordance with the operation of the motor, said means for shifting the phase of the modulating current in accordance with the motor controlling action desired acting to distrub said quadrature phase relationship, the amount thereof being in accordance with the desired operation of the motor, said quardrature phase relationship being reestablished upon operation of the variable phase shifting network by operation of said motor the desired amount.

STUART W. SEELEY.